United States Patent
Quigg

[15] 3,692,453
[45] Sept. 19, 1972

[54] BLADE AND ANVIL PINCH-OFF WITH COMPRESSION SEALING MEANS

[72] Inventor: Donald J. Quigg, c/o Phillips Petroleum Company, Bartlesville, Okla. 74003

[22] Filed: Jan. 4, 1971

[21] Appl. No.: 103,372

[52] U.S. Cl. .................... 425/326, 83/914, 425/308
[51] Int. Cl. ............................................. B29d 23/03
[58] Field of Search ........ 18/5 BN, 5 BE, 5 BZ, 5 BQ, 18/5 BB, 5 BF, 5 BH, 5 BK, 5 BS; 425/326 B; 83/9.14; 264/94

[56] References Cited

UNITED STATES PATENTS

| | | |
|---|---|---|
| 3,163,690 | 12/1964 | Scott .................... 18/5 BS X |
| 3,354,246 | 11/1967 | Branscum ............... 18/5 BS X |
| 2,908,034 | 10/1959 | Hackett ................. 18/5 BK X |
| 3,008,191 | 11/1961 | Park ..................... 18/5 BE X |
| 3,309,442 | 3/1967 | Stanley .................. 18/5 BB X |
| 3,479,420 | 11/1969 | Wilson et al. .......... 18/5 BZ X |
| 3,584,091 | 6/1971 | Nave ..................... 18/5 BE X |
| 3,592,885 | 7/1971 | Goins et al. ............ 18/5 BZ X |

FOREIGN PATENTS OR APPLICATIONS

| | | | |
|---|---|---|---|
| 789,816 | 1/1958 | Great Britain | ............ 18/5 BS |

*Primary Examiner*—J. Spencer Overholser
*Assistant Examiner*—Michael O. Sutton
*Attorney*—Young and Quigg

[57] ABSTRACT

A mold half in a blow molding apparatus has a projecting blade offset from a bottom wall forming surface thereof. This blade cooperates with a recessed area on a second mold half in a relationship similar to that of a halved or lap-spliced joint, to sever a parison and form a compression seal adjacent the severed end. In this way, a seal can be obtained on a parison which is at a temperature below that at which it is generally regarded as sealable.

8 Claims, 6 Drawing Figures

INVENTOR.
D. J. QUIGG

BY Young + Quigg

ATTORNEYS

1

BLADE AND ANVIL PINCH-OFF WITH COMPRESSION SEALING MEANS

BACKGROUND OF THE INVENTION

This invention relates to an improved method and apparatus for sealing a hollow parison preparatory to blow molding.

Traditionally, blow molded articles have been formed by the downward extrusion of a molten parison from an annular die into position between opposing mold halves. The mold halves are then closed and fluid pressure introduced into the parison to expand same into conformity with the mold.

Recently, techniques have been developed whereby high strength articles having exceptional sparkle and clarity can be produced by blow molding a parison preform which has been cooled to room temperature and thereafter reheated to orientation temperature so as to achieve molecular orientation in the resulting article during the fabrication steps. Such a technique is disclosed in Turner et al., U.S. Pat. No. 3,390,426, the disclosure of which is hereby incorporated by reference. A particularly economical way to produce individual parison preforms is to extrude a continuous length of tubular material and thereafter sever it into individual work pieces, as opposed to injection molding a closed end parison preform, for instance. However, this preferred method of forming individual parison preforms carries with it the inherent disadvantage of providing a preform which is open at each end and which, therefore, must be closed at one end preparatory to blow molding. Thus, in order to operate economically with individual parison preforms, the artisan is faced with the problem of achieving a seal in a parison which is at orientation temperature and thus far below the temperature at which the parison would be easily sealable. Such preforms can be sealed by the application of extremely high pressure from a plurality of directions radially inward toward a point while simultaneously pressing downward on the thus closed end, but this involves the use of complex equipment and increases the cycle time.

SUMMARY OF THE INVENTION

It is an object of this invention to seal an open end parison preform at orientation temperature; it is a further object of this invention to provide an improved seal on a parison preform; it is yet a further object of this invention to provide a simple apparatus for achieving difficult sealing operations; and, it is yet a further object of this invention to make possible the economic production of high strength, clear bottles.

In accordance with this invention a hollow parison is severed and a compression seal formed adjacent said thus severed end by closing on said parison two mold halves, one of which has a projecting blade offset from a wall forming surface thereof which blade fits into a recessed area below a wall forming surface of the second mold half, ends of said two halves below said two wall forming surfaces cooperating to form said compression seal.

BRIEF DESCRIPTION OF THE DRAWINGS

In the drawings, forming a part hereof, wherein like reference characters denote like parts in the various views.

DESCRIPTION OF THE PREFERRED EMBODIMENTS

The instant invention is applicable for the sealing of any hollow, elongated article having triangular, square, or round shape or the like, although its primary utility will be found in the sealing of cylindrical parison preforms.

The parison preforms which are sealed in accordance with the instant invention can be made of any orientable material. Suitable materials include a crystalline polymer such as polymers of at least one mono-1-olefin having two to eight carbon atoms per molecule, preferably polymers and copolymers of ethylene, propylene and butene, more preferably polypropylene; and amorphous polymers such as polyvinyl chloride, various styrene/butadiene-containing resins, and the like.

The open end parison preforms to be sealed in accordance with this invention can be formed by any means known in the art, although the preferred means is to simply extrude a tube or pipe in a manner conventional in the art and thereafter sever this continuous extrudate into work pieces of the desired length.

The open end parison preforms are preferably heated to orientation temperature just prior to sealing and blow molding. By orientation temperature it is meant that temperature at which polymers on stretching exhibit increased strength. For crystalline polymers this temperature is generally in the range of 1°–50 F., preferably 10°–30° F. below the crystalline melting point. For amorphous polymers this temperature is generally 40°–225° F., preferably 100°–175° F. below the homogeneous melting point.

The portion of the mold which constitutes the sealing and severing means can be made of any suitable metal. A preferred metal is Vega steel, hardened to a 59 to 61 Rockwell C hardness.

Figure 1:
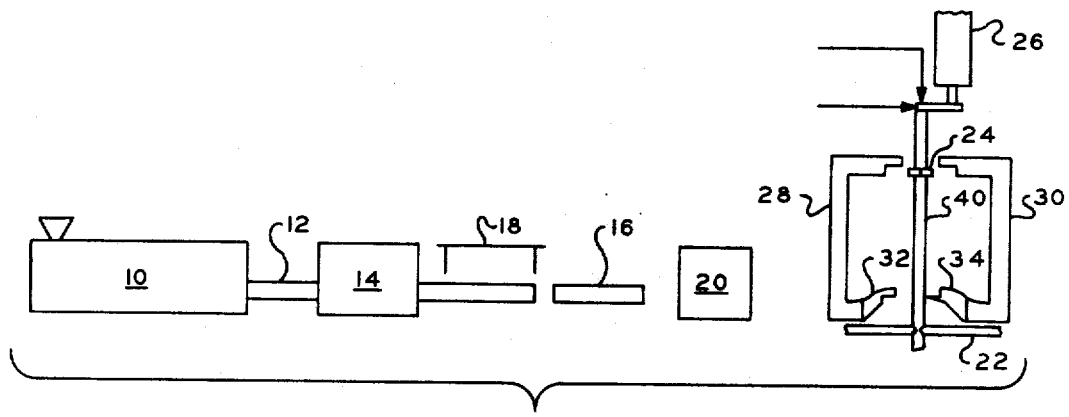
FIG. 1 is a schematic representation of a blow molding apparatus employing the sealing and severing members of the instant invention.

Referring now to the FIGS., particularly FIG. 1, there is shown an extruder 10 for forming a tubular extrudate 12 which is passed through vacuum cooling and sizing tank 14. Thereafter the thus-formed tube is cut into individual open end parison preforms 16 by cutting mechanism 18. Parison preforms 16 are then passed through reheating oven 20 where they are heated to orientation temperature. They are then transferred to a molding zone by means of transfer mechanism 22 which places the other end of the parison into thread forming head 24. Cylinder 26 serves as a means for effecting relative movement between mechanism 22 and head 24 so as to stretch the parison longitudinally. Leading edges of the lowermost portion of mold halves 28 and 30 comprise inserts 32 and 34 which inserts are designed to cooperate in a relationship similar to a halve or a lap-spliced joint. Parison 40 is disposed so that the center thereof will be coincident with the centerline of the mold halves 28 and 30.

Figure 2:
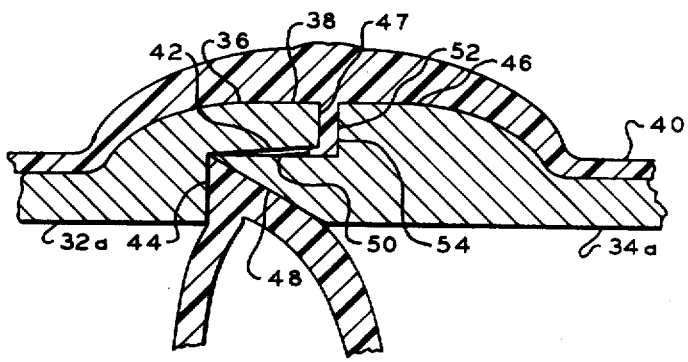
FIG. 2 is a detailed view of one embodiment of the sealing and severing member.

Referring now to FIG. 2 there is shown inserts 32a and 34a which are similar to inserts 32 and 34 of FIG. 1. Insert 32a comprises tendon projection 36 having an upper wall forming surface 38 for forming the wall of the article being molded from the parison 40 and a second surface 42 on the opposite side from surface 38, said surface 42 being shown flat and sloping inwardly and upwardly in the direction of said projection. Insert 32a further has a recessed face 44. Tendon projection 36 terminates in a leading end 47. Insert 34a has a wall forming surface 46 which cooperates with wall forming surface 38 of insert 32a to form the bottom wall of the article being molded. Offset from said wall forming surface 46 is blade 48 having a flat upper surface 50. Flat end 52 of insert 34a which is disposed between blade 48 and wall forming surface 46 cooperates with leading end 47 of tendon projection 36 to compression form tab 54.

In FIG. 2 surface 42 of tendon projection 36 is shown tapering in a direction towards the direction of projection. This taper is shown in exaggerated form in this figure for the purpose of illustration. The purpose of the taper is to allow blade 48 to come in sliding contact with the surface 42 so as to shear the parison tail and form a clean cut. Plastic materials are difficult to cut cleanly during molding operations, however, the provision in the instant invention for producing a "wiping" cut allows the material to be spread very thin where it will cool further and be susceptible to complete severing. Also, this slope of surface 42 allows for slight variation in the alignment of the mold halves and yet give a clean cut and at the same time not allow the tip of the blade to directly strike leading end 47. Generally this slope will be 1°–30°, preferably 2°–15°. While this configuration is greatly preferred, surface 42 can be flat as opposed to sloping as shown in FIG. 1.

When the molds are in fully closed position the tip of blade 48 impinges upon recessed flat face 44 of insert 32a leaving a gap between leading end 47 of member 32a and end 52 of member 34a. Tab 54 is considerably narrower than the combined thicknesses of the walls of the parison 40. Since downward flow of the polymer has been precluded from the time the tip of blade 48 passed leading end 47 of member 32a, two significant results are obtained. First, tab 54 is compression formed which results in extremely high pressure being exerted, forcing the walls of the parison together so that a seal is effected even though the parison may be at a temperature below that at which it is normally considered sealable. Second, what flow does occur must occur in an upwardly direction and this results in a thickened area just above the tab as opposed to the usual "trough line" above the sealing line. This, then, produces a double reinforcement of the seal in that the area above the seal is thickened and further the seal is formed under severe compression conditions. In addition, the upward flow of polymer from the tab area results in movement of the polymer at the interface causing some mechanical mixing action and a resultant small but significant heat buildup in the exact area where heat is required, while only a few thousandths of an inch away the wiping action results in cooling the polymer where it is necessary to have it in a colder condition to effect a clean cut.

Figure 3:
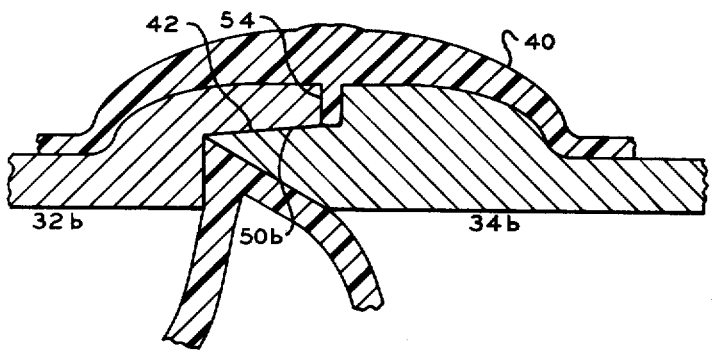
FIG. 3 is a view of another embodiment of the sealing and severing member.

FIG. 3 shows another alternative embodiment of members 32b and 34b wherein surfaces 42 and 50b both have complementary slopes so as to come together at or near the time of final closing of the mold halves. This reduces wear on these surfaces, and further reduces the criticality of the mold alignment.

Figure 4:
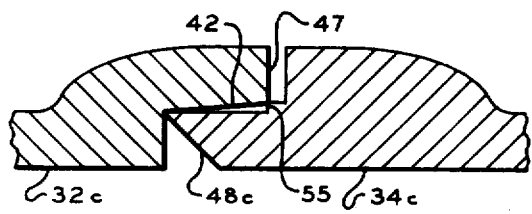
FIG. 4 is a view of still another embodiment of the sealing and severing member.

FIG. 4 shows yet another alternative embodiment wherein insert 34c has ledge 55 which cooperates with an edge of end 47 of member 32c to shear off any "flash" of polymer which may have formed at the lower corner of tab 54 during the severing action. Of course this is shown in greatly exaggerated size, ledge 55 generally being only a few mils in height; for instance the height of ledge 55 may be 1–10, preferably 2–4 mils, which height is equal to the total slope of surface 42.

The thickness or lateral width of the tab can vary greatly depending upon the thickness of the parison. Generally, the final lateral dimensions of the tab will be 5 to 50, preferably 10 to 25, percent of the combined thickness of the side walls of the parison on initial contact with the sealing and severing members. Thus with parisons with a size suitable for forming ordinary bottles final dimensions of the tab will generally be 10 to 100, preferably 20 to 50, mils. The height of the tab, that is, the distance it depends downward from the bottom surface of the bottom wall of the article being molded, can vary greatly. Generally, it will be in the neighborhood of 20 to 140, preferably 25 to 60, mils.

Figure 5:
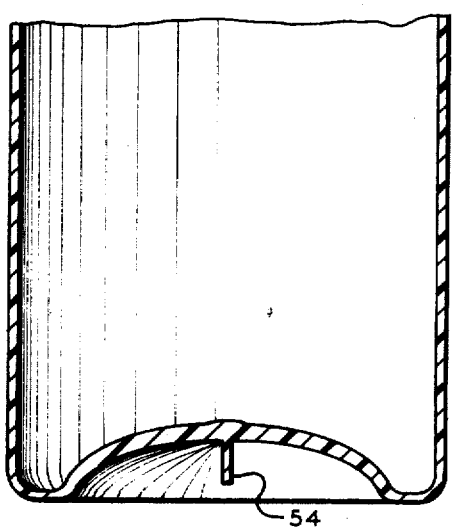
FIG. 5 is a cross-sectional view of the lower portion of a bottle made in accordance with the invention.
Figure 6:
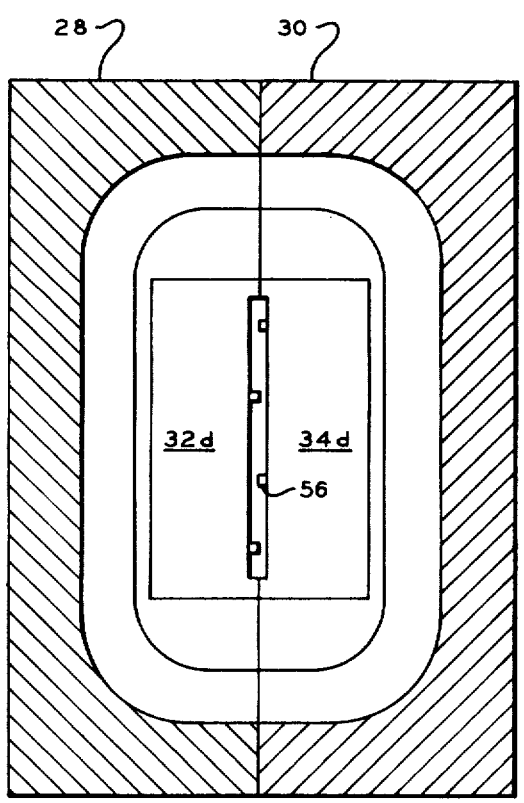
FIG. 6 is a cross-sectional view of an apparatus in accordance with another alternative embodiment of the invention..

FIG. 5 shows a cross-sectional view of the lower portion of the bottle sealed and severed in accordance with the invention. Tab 54 has a rectangular configuration as also shown in FIG. 2. However, leading end 47 and end 52 can be contoured so as to give any desired shape to the tab. This is shown, for instance, in FIG. 6 which is a sectional view looking down on the inside of the mold showing inserts 32d and 34d having alternate pins 56 which give a shaped tab. These pins generally have a length of about 50 to 90, preferably 70 to 80, percent of the thickness of the tab. As used throughout this specification and claims, the term "shaped" tab means a contoured tab having any shape other than the rectangular cross-sectional shape shown in FIG. 3.

It has been found that in some instances, it is preferred to preblow the parison slightly before the mold halves close. By careful timing of the sequence of steps wherein the preblow fluid is introduced into the sealed-off parison just after the mold halves begin to close, preblow fluid under the pressure normally utilized for the main blow, that is, pressure of 60 to 200, preferably 90 to 150 psig can be utilized as the preblow fluid also. In all events where preblow is utilized, a higher pressure must be utilized than the 3 to 6 psig which is standard in the industry for preblowing thoroughly molten parisons. Generally a preblow pressure of at least 25 psig, preferably at least 25 to 50 psig is utilized. The combination of preblowing and compression sealing results in a particularly strong seal. The seal is further improved if the parison is stretched longitudinally in the area to be sealed.

In operation, then, as the mold halves 28 and 30 close inserts 32 and 34 first flatten the parison near the end to be sealed and then the tab is compression formed while simultaneously the parison is severed by a shearing action immediately adjacent an end of said tab.

While the drawings depict the mold with the thread forming means disposed on the top, the apparatus can be disposed in any plane and in many instances it will be preferred to have the thread forming means at the bottom and form the bottle or the like upside down.

Many conventional parts have been omitted in the drawings for the sake of simplicity, but their inclusion is understood by those skilled in the art and is within the scope of the invention.

CALCULATED ILLUSTRATIVE EMBODIMENT

Propylene homopolymer having a density of 0.905 (ASTM D 1505–63T), and a melt flow of 2 (ASTM D 1238–62T, Condition L), and a crystalline melting point of about 340° F. is extruded into tubing having an outside diameter of 0.8–inch and a wall thickness of 0.150–inch. The tubing is cooled to room temperature in a vacuum sizing and quenching chamber and cut into 7–inch lengths. These 7–inch lengths are heated to a temperature of 320° F. The thus heated blanks are then placed in thread forming jaws such as are shown in FIG. 1 while being held at the other end thereof by gripping fingers similar to those shown in FIG. 1. Relative axial movement is effected between said thread forming means and said gripping fingers to achieve a longitudinal stretch ratio of 2:1. Thereafter, preblow air at a pressure of 50 psig is introduced into the interior of the parison to give a slight radial expansion to the parison. Thereafter mold parts having a sealing configuration identical to that shown in FIG. 2 are closed upon the parison. These operations are carried in immediate succession so that the parison remains at orientation temperature. Main blow fluid at a pressure of 150 psig is then introduced into the interior of the parison to cause it to conform to the shape of the mold to give a biaxially oriented bottle having clear, high strength walls. A tab 30 mils wide is formed extending the length of the seal line, said tab depending from the bottom wall of the bottle a distance of 80 mils. The tab is cleanly severed from the tail portion of the parison and the resulting bottle has a seal which is resistant to rupture.

While this invention has been described in detail for the purpose of illustration, it is not to be construed as limited thereby, but is intended to cover all changes and modifications within the spirit and scope thereof.

I claim:

1. A blow molding apparatus including a mold comprising in combination:
    a first mold half having a wall forming surface and a blade having a pointed leading edge projecting toward a center line of said mold, said blade having a flat surface offset from said wall forming surface;
    a second mold half having a tendon projection disposed toward said center line, one surface of said tendon projection being a wall forming surface which cooperates with said wall forming surface of said first half, said second half further having a recessed area into which said blade fits on closing said mold halves, said pointed leading edge of said blade being coincident with said flat surface of said blade and disposed so as to slide adjacent a surface of said tendon projection within said recess which surface within said recess is opposite said wall forming surface of said tendon projection, said first and second mold halves being so contoured that in fully closed position a narrow gap exists between a leading end of said tendon projection and an end of said first half between said wall forming surface of said first half and said flat surface of said blade;
    means to grasp a first end of a parison preform;
    means to grasp a second end of said parison preform; and
    means to effect relative movement of said means to grasp said first and second ends.

2. Apparatus according to claim 1 wherein said gap has a lateral dimension of 10 to 100 mils and said leading end of said tendon projection and said end of said first mold half have a height of 20 to 140 mils said end of said first half being a flat wall extending directly between said wall forming surface of said first half and said flat surface of said blade.

3. Apparatus according to claim 1 wherein at least the sealing and severing portions of said mold halves are of metal hardened to a 59 to 61 Rockwell C hardness.

4. Apparatus according to claim 1 wherein said mold is a bottle mold.

5. Apparatus according to claim 1 wherein said leading end of said tendon projection and said end of said first half are so contoured as to define a shaped tab mold.

6. A blow molding apparatus including a mold comprising in combination:
    a first mold half having a wall forming surface and a blade having a pointed leading edge projecting toward a center line of said mold, said blade having a flat surface offset from said wall forming surface;
    a second mold half having a tendon projection disposed toward said center line, one surface of said tendon projection being a wall forming surface which cooperates with said wall forming surface of said first half, said second half further having a recessed area into which said blade fits on closing said mold halves, said pointed leading edge of said blade being coincident with said flat surface of said blade and disposed so as to slide adjacent a surface of said tendon projection within said recess which surface within said recess is opposite said wall forming surface of said tendon projection and which surface slopes toward said wall forming surface in a direction toward a leading end of said tendon projection, said first and second mold halves being so contoured that in fully closed position a narrow gap exists between said leading end of said tendon projection and an end of said half between said wall forming surface of said first half and said flat surface of said blade.

7. An apparatus according to claim 6 wherein said surface of said tendon projection opposite said wall forming surface and said flat surface of said blade having a complimentary slope.

8. An apparatus according to claim 6 wherein said flat surface of said blade has a ledge of height equal to the amount of said slope, said ledge cooperating with an edge of said leading end of said tendon projection.

* * * * *

UNITED STATES PATENT OFFICE

CERTIFICATE OF CORRECTION

Patent No. 3,692,453　　　Donald J. Quigg　　　Dated: Sept. 19, 1972

It is certified that error appears in the above-identified patent and that said Letters Patent are hereby corrected as shown below:

Cover page, first column, following paragraph No. [72], add:

--- [73] Assignee: Phillips Petroleum Company, Bartlesville, Okla. ---

Column 6, line 61, insert --- first --- after "end of said".

Column 6, line 66, delete "having" and insert therefor

--- have ---.

Signed and sealed this 22nd day of May 1973.

(SEAL)
Attest:

EDWARD M. FLETCHER, JR.　　　　　　　ROBERT GOTTSCHALK
Attesting Officer　　　　　　　　　　Commissioner of Patents